(12) United States Patent
Haag et al.

(10) Patent No.: US 7,049,516 B1
(45) Date of Patent: May 23, 2006

(54) ELECTRICAL ENCLOSURE AND COVER ASSEMBLY THEREFOR

(75) Inventors: David K. Haag, Sumter, SC (US); William M. Crooks, Sumter, SC (US)

(73) Assignee: Eaton Corporation, Cleveland, OH (US)

( * ) Notice: Subject to any disclaimer, the term of this patent is extended or adjusted under 35 U.S.C. 154(b) by 30 days.

(21) Appl. No.: 11/080,267

(22) Filed: Mar. 14, 2005

(51) Int. Cl.
*H02G 3/14* (2006.01)

(52) U.S. Cl. .............................. 174/66; 174/67; 174/48; 220/241; 220/242; 220/3.8

(58) Field of Classification Search .................. 174/66, 174/67, 50, 17 R, 53, 58, 99 R, 48; 220/3.2, 220/3.8, 4.02, 241, 242; 439/535, 540.1; 361/622, 659, 652, 600, 724, 730, 601
See application file for complete search history.

(56) References Cited

U.S. PATENT DOCUMENTS

| | | | | |
|---|---|---|---|---|
| 3,566,194 | A * | 2/1971 | Gryctko | 361/652 |
| 3,808,509 | A * | 4/1974 | Frazier | 174/66 |
| 5,072,848 | A * | 12/1991 | Pipis et al. | 174/66 |
| 5,232,277 | A | 8/1993 | Cassady et al. | |
| 5,389,740 | A * | 2/1995 | Austin | 174/67 |
| 5,430,248 | A * | 7/1995 | Levy | 174/50 |
| 5,665,936 | A * | 9/1997 | Sawamura et al. | 174/99 R |
| 5,886,868 | A * | 3/1999 | White et al. | 361/652 |
| 5,929,379 | A * | 7/1999 | Reiner et al. | 220/241 |
| 6,046,904 | A | 4/2000 | Kubat | |
| 6,070,297 | A | 6/2000 | Borer | |
| 6,184,468 | B1 * | 2/2001 | Speziale | 174/66 |
| 6,313,980 | B1 | 11/2001 | Craft et al. | |
| 6,421,229 | B1 | 7/2002 | Campbell et al. | |
| 6,483,032 | B1 * | 11/2002 | Adams | 174/66 |
| 6,879,483 | B1 * | 4/2005 | Johnson et al. | 438/535 |

OTHER PUBLICATIONS

U.S. Appl. No. 10/652,466

* cited by examiner

*Primary Examiner*—Angel R. Estrada
(74) *Attorney, Agent, or Firm*—Martin J. Moran

(57) ABSTRACT

A cover assembly controls access to the interior of an electrical enclosure. The electrical enclosure includes a housing having a panel and a plurality of walls extending from the panel to define an opening. The cover assembly includes a door-in-door assembly with first and second hinged doors and a concealed mounting mechanism. The concealed mounting mechanism secures the door-in-door assembly to the housing without requiring a separate securing mechanism. The first hinged door pivots open to access the housing without requiring the first door to be entirely removed. The second hinged door is smaller and thus provides convenient access through a cut-out portion of the larger first door. Access may be further controlled via a locking mechanism for locking the second door in a closed position within the first door.

2 Claims, 6 Drawing Sheets

ELECTRICAL ENCLOSURE AND COVER ASSEMBLY THEREFOR

BACKGROUND OF THE INVENTION

1. Field of the Invention

The present invention relates generally to electrical enclosures and, more particularly, to a cover assembly for an electrical enclosure, such as a panelboard or other load carrier. The invention also relates to electrical enclosures employing a cover assembly.

2. Background Information

Electrical equipment (e.g., without limitation, relays; circuit breakers; electric meters; transformers) are typically housed within an enclosure, such as, for example, a housing, such as a box or cabinet, in order to restrict access to the electrical equipment thereby resisting potential injury, and to resist unauthorized tampering with the electrical equipment, in general.

Such electrical enclosures include, for example, panelboards or other load centers which are designed to be secured to the wall of a building. Specifically, panelboards are known to be mounted either on the exterior surface of the wall or within a prepared opening in the wall (e.g., flush mounted panelboards, wherein the front panel of the panelboard is flush with respect to the surface of the wall). In either case, the panelboard typically includes a back panel and two sidewalls, a bottom wall and a top wall extending outwardly from the back panel in order to define a front opening and thus form the housing. The electrical equipment is mounted within the housing and a front panel, or cover assembly, is coupled to the sidewalls and/or the top and bottom walls in order to cover the front opening.

A variety of electrical enclosure front panels, or covers, have been developed in an attempt to achieve an optimum balance between the generally conflicting design objectives of permitting quick and easy access to the electrical equipment housed within the enclosure, while simultaneously resisting unauthorized access to the interior of the enclosure. Unauthorized access must be sufficiently restricted in order to prevent, for example, injury (e.g., electrical shock) or vandalism of the electrical equipment. However, the cover must also sufficiently enable authorized access to the enclosed electrical equipment relatively quickly in order to, for example, promptly reset a tripped circuit breaker or to perform routine maintenance. Still further complicating the design of electrical enclosure front covers, is the additional consideration of appearance. It is desirable that the resulting design be aesthetically pleasing.

Some electrical enclosures employ a removable front panel cover design. However, such panels are typically one-piece and can, therefore, be large and cumbersome to handle. The removable panels are also typically secured to the walls of the housing using a plurality of fasteners, such as screws or bolts. Accordingly, the panel requires the use of a separate tool, such as a screw-driver, in order to open and re-close the electrical enclosure. Not only is the need to remove numerous fasteners time-consuming and inefficient, but such a design also permits any individual in possession of a screw driver, or other suitable tool, to simply remove the fasteners connecting the panel to the enclosure, in order to gain access to the interior of the enclosure.

A number of hinged cover assemblies have been developed in an attempt to overcome the undesirable requirement of entirely removing the front panel. Such designs typically include a single hinge, such as a piano hinge, or a number of separate hinges which are attached to one of the sidewalls of the housing and to an edge of the front panel, thereby forming a hinged door. The hinged door is operable between an open position, in which the door is pivoted outwardly, away from the enclosure, thereby providing access to the interior of the enclosure, and a closed position in which the door abuts the enclosure and the interior of the enclosure is inaccessible. Most hinged door designs also employ a lock, in order to address the issue of undesired access to the interior of the enclosure. However, the door hinge mechanism is typically exposed thus permitting the lock to be bypassed and the enclosure to be opened by, for example, removing the hinge pins of the hinges attaching the door. The exposed hinges also detract from the aesthetic appeal of the enclosure.

Additional disadvantages of known panelboard door designs include the fact that they generally require a peripheral trim or a door catch which must be fastened to the walls of the enclosure by a plurality of mechanical fasteners. They also require the entire panel, or door, to be opened. In addition to the relatively large size of the entire panel, which can be cumbersome and awkward to open, opening the entire front panel exposes the top edges of the walls of the housing, which can be sharp and could, therefore, injure (e.g., cut) an individual attempting to gain access to the enclosure. Moreover, the mechanical fasteners securing the panel or trim to the walls can be removed, creating the possibility of the entire cover assembly being removed in order to gain unauthorized access to the interior of the enclosure.

There is room, therefore, for improvement in electrical enclosures and in cover assemblies for electrical enclosures.

SUMMARY OF THE INVENTION

These needs and others are satisfied by the present invention, which provides a cover assembly for an electrical enclosure that utilizes a combination of a concealed mounting mechanism and a door-in-door assembly in order to provide fast and efficient authorized access to the interior of the enclosure. Furthermore, the cover assembly preferably simultaneously resists unauthorized access. In addition, attachment of the cover assembly to the walls of the electrical enclosure housing does not require any additional, independent mounting hardware (e.g., mechanical fasteners).

As one aspect of the invention, a cover assembly for an enclosure including a panel and walls extending from the panel to define an opening, comprises: a door-in-door assembly including a first door and a second door, the first door having a cut-out portion and being structured to cover the opening of the enclosure, the second door being hinged within the cut-out portion of the first door; and a concealed mounting mechanism for securing the door-in-door assembly to at least one of the walls of the enclosure without requiring a separate securing mechanism, wherein the second door hinged within the cut-out portion of the first door is operable between an open position in which the interior of the enclosure is accessible through the cut-out portion, without having to open the first door, and a closed position in which the cut-out portion is closed and the interior of the enclosure is inaccessible.

The first door may be a hinged panel member structured to pivot open in order to provide access to the interior of the enclosure without having to entirely remove the first door. The hinged panel member may be coupled to the at least one of the walls of the enclosure by a single elongated piano hinge or, alternatively, by a plurality of separate hinges. The hinges may be telescoping pin-slide hinges adapted to permit the door-in-door assembly to adjust in relation to the enclosure in order to provide a secure fit therebetween.

The concealed mounting mechanism may be a number of interconnecting receptacles and tab projections wherein the inner surface of the hinged panel member of the first door includes the tab projections and wherein at least the at least one of the walls of the enclosure includes a flange having the interconnecting receptacles, each of the interconnecting receptacles being structured to receive and secure one of the tab projections. The interconnecting receptacles and tab projections may be telescoping interconnecting receptacles and tab projections in order to provide adjustment of the door-in-door assembly with respect to the enclosure.

The second door of the cover assembly may comprise a third panel portion pivotally hinged within the cut-out portion of the second panel portion by at least one hinge wherein the third panel portion has an edge. The at least one hinge may include a plurality of separate hinges which may be concealed hinges, each of which comprises a first hinge element coupled to the second panel portion adjacent the cut-out portion therein and a second hinge element coupled to third panel portion adjacent the edge thereof and cooperating with the first hinge element.

As another aspect of the invention, an electrical enclosure comprises: a housing comprising a panel and a plurality of walls extending from the panel to define an opening; a cover assembly coupled to the walls in order to provide controlled access to the interior of the housing, the cover assembly comprising: a door-in-door assembly including a first door and a second door, the first door having a cut-out portion and being structured to cover the opening of the electrical enclosure, the second door being hinged within the cut-out portion of the first door; and a concealed mounting mechanism for securing the door-in-door assembly to at least one of the walls of the electrical enclosure without requiring a separate securing mechanism, wherein the second door hinged within the cut-out portion of the first door is operable between an open position in which the interior of the electrical enclosure is accessible through the cut-out portion, without having to open the first door, and a closed position in which the cut-out portion is closed and the interior of the electrical enclosure is inaccessible.

The door-in-door assembly may include a locking mechanism structured to lock the second door in a closed position within the first door.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
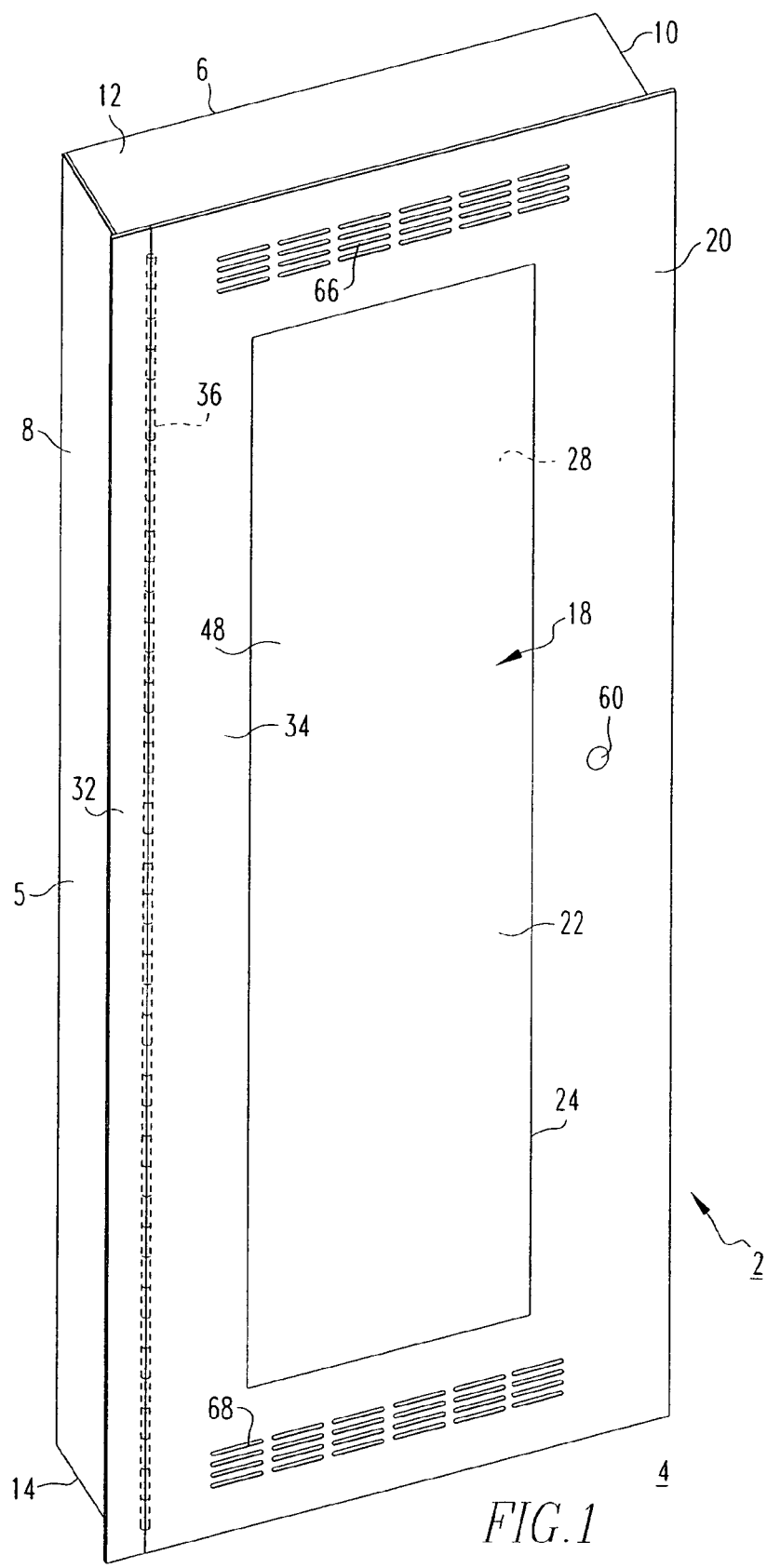
FIG. 1 is an isometric view of an electrical enclosure including a cover assembly with concealed mounting hardware and a door-in-door assembly, in accordance with the invention.

For purposes of illustration, the present invention will be described as applied to an electrical enclosure for enclosing electrical equipment (e.g., without limitation, relays; circuit breakers; electric meters; transformers), although it will become apparent that it could also be applied to other types of enclosures adapted to provide controlled access to one or more articles housed therein.

Directional phrases used herein, such as, for example, left, right, clockwise, counterclockwise, up, down and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall refer to one or more than one (i.e., a plurality).

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the term "securing mechanism" refers to any known or suitable fastening or securing device which is separate from the exemplary concealed mounting mechanism of the invention. For example, without limitation, a separate securing mechanism within the context of the invention expressly includes, but is not limited to, fasteners of the type previous defined herein.

As employed herein, the term "Tox-lock" refers to a fastening mechanism in which a mechanical weld is created by metal deformation such as, for example, at the corners, edge portions and seams of a metallic cabinet, which are folded and deformed to create mechanical welds therein.

As employed herein, the term "concealed" shall mean hidden or otherwise inaccessible. For example, the exemplary concealed mounting mechanism of the invention is hidden from the perspective of the exterior of the housing. In other words, all components of the concealed mounting mechanism are disposed within the interior of the electrical enclosure housing, thereby being inaccessible from the exterior. Similarly, the exemplary hinges securing each door (e.g., first and second doors) of the door-in-door assembly of the invention, are also concealed.

Figure 2:
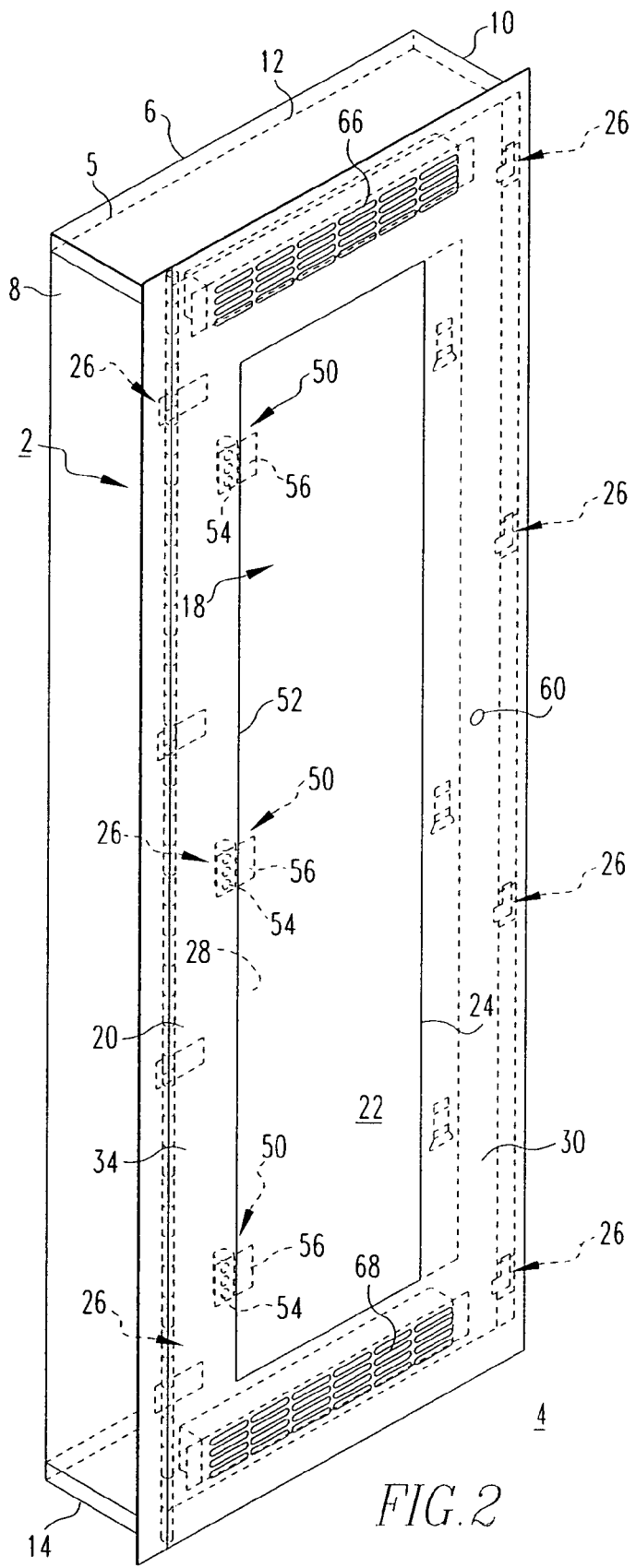
FIG. 2 is an isometric view of the electrical enclosure and cover assembly of FIG. 1, showing internal structures in hidden line drawing.
Figure 3:
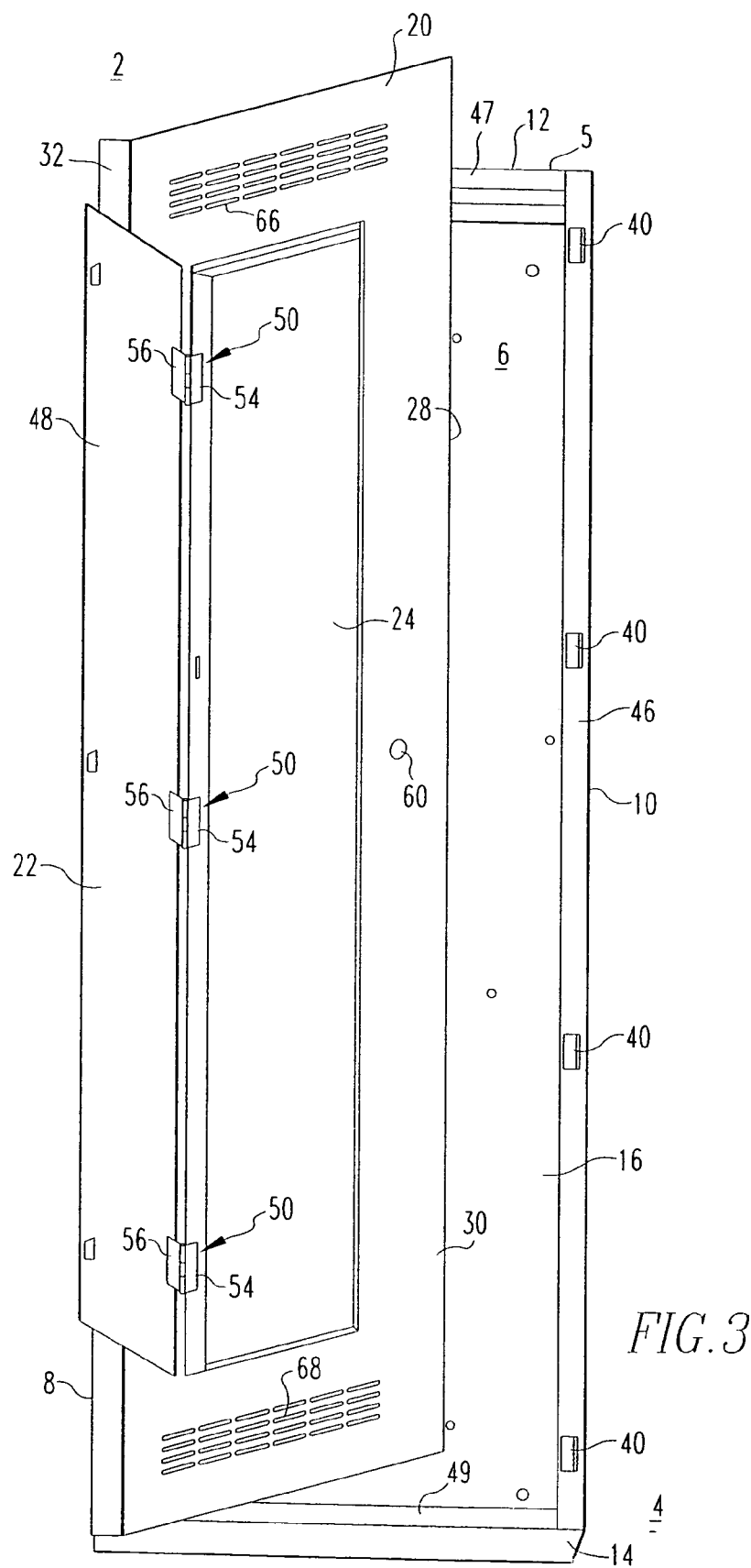
FIG. 3 is an isometric view of the electrical enclosure and cover assembly of FIG. 1, modified to show both panels of the door-in-door assembly in their open positions.

FIGS. 1 and 2 show an enclosure, such as an electrical enclosure (e.g., without limitation, a panel board or load center) for employing an improved cover assembly 2 in accordance with the invention. As shown, the electrical enclosure 4 generally includes a housing 5 comprising a panel 6 and a plurality of walls 8, 10, 12, 14 extending from the panel 6 to define an opening 16 (FIG. 3). Specifically, the exemplary housing 5 includes a back panel 6, a left side wall 8, a right side wall 10, a top wall 12, and a bottom wall 14 extending from the back panel 6 in order to define a front opening 16 (FIG. 3). The housing 5 is contemplated as being made from a metal material, such as galvanized steel, although any known or suitable alternative material could be employed. The seams or intersections of the walls (e.g., the intersection of left side wall 8 and top wall 12 of FIG. 2) may be secured in any known or suitable fashion. For example, without limitation, they may be spot welded or Tox-locked, as defined hereinbefore.

The cover assembly 2 of the invention includes a door-in-door assembly 18 and a concealed mounting mechanism 26 (FIG. 2) for securing the door-in-door assembly 18 to at least one of the walls 8, 10, 12, 14 of the housing 5 without requiring a separate securing mechanism. The door-in-door assembly 18 of the example, as shown and described herein, is coupled to both of the left and right sidewalls 8, 10. However, any suitable alternative securing arrangement (not shown) could be employed without departing from the scope of the invention. For example, the concealed mounting mechanism 26 could be arranged to secure the door-in-door assembly 18 to all four walls 8, 10, 12, 14 of the housing 5 or to any combination of one or more of the side walls. A more detailed discussion of the exemplary concealed mounting mechanism 26 and the manner in which it secures the cover assembly 2 to the housing 5 will be discussed hereinbelow with reference to FIGS. 3–6.

As can be appreciated with reference to FIGS. 1–4, the door-in-door assembly 18 includes a first door 20 and a second door 22 disposed within a cut-out portion 24 of the first door 20. The second door 22 is hinged within the generally centrally located cut-out portion 24 of the first door 20 in order to be operable between an open position (FIGS. 3 and 4) in which the interior of the housing 5 is accessible through the cut-out portion 24, without having to open the first door 20, and a closed position (FIGS. 1 and 2) in which the cut-out portion 24 is closed and the interior of the housing 5 is inaccessible. It will be appreciated that although the first door 20 is also open in the example of FIG. 3, that, under normal use, the larger, first door 20 would be closed and secured to the right side wall 10 of the housing 5. However, it is important to note that that the first door 20 is also hinged in order to enable it to pivot open and provide additional access to the entire interior of the housing 5 without having to entirely remove the cover assembly 2. Accordingly, the door-in-door assembly 18 of the invention overcomes the disadvantages associated with known non-removable front panel cover assemblies.

The exemplary first door 20 is a hinged panel member having an inner surface 28 (best shown in FIGS. 4–6) facing the interior of the housing 5 and an exterior surface 30. In the example shown and discussed herein, the hinged panel member 20 includes a generally stationary first panel portion 32 coupled to the left side wall 8 (FIGS. 1–3; see also left side wall 8' of FIG. 6) of the housing, and a larger second panel portion 34 which is pivotally hinged to the first panel portion 32 by one or more hinges 36 (FIG. 1; see also separate, telescoping hinge 38 of FIG. 6). Thus, the larger second panel portion 34 substantially defines the first door 20 and includes the aforementioned cut-out portion 24 therein, as shown. The hinge 36 securing the second panel portion 34 to the first panel portion 32 is a single elongated piano hinge (shown in hidden line drawing in FIG. 1). Alternatively, a plurality of separate hinges 38 (FIG. 6), or any known or suitable type of hinge may, however, be employed. For example, as shown in FIG. 6, the separate hinges 38 (one is shown) are telescoping pin-slide hinges adapted to permit the door-in-door assembly 18' to adjust in relation to the electrical enclosure housing 5 in order to provide a secure fit therebetween. As employed herein, the term "telescoping" refers to a hinge (e.g., 38) that provides adjustment of the second panel portion 34 with respect to the housing 5, in order to provide an improved fit between the door 20 and the electrical enclosure 4. The exemplary pin-slide hinges 38 include a pin member 39 (FIG. 6), which is received in and is adjustable with respect to a receiving portion 41 (FIG. 6), in order to provide such telescopic capabilities. It will be appreciated that any suitable alternative configuration for pivotally securing the first door 20 to the housing 5 other than the exemplary first and second panel portions 32, 34, could be employed. For example, the first door 20 could be directly hinged to a side wall (e.g., left side wall 8) without requiring two or more separate panel portions.

Figure 4:
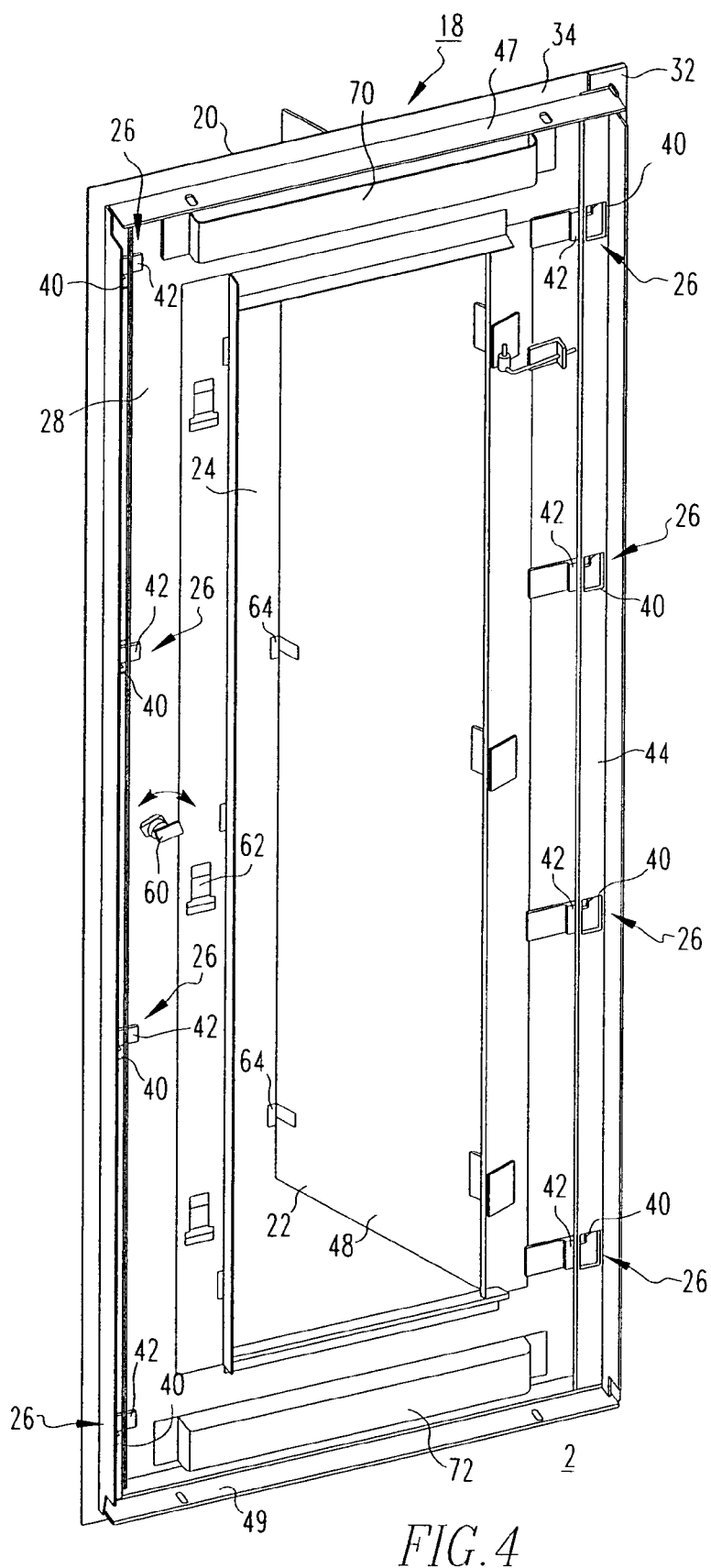
FIG. 4 is an isometric view of the inner side of the cover assembly of FIG. 1 with the smaller panel of the door-in-door assembly in the open position.

As best shown in FIGS. 3 and 4, the larger second panel portion 34 of the first door 20 further includes the second door 22 which generally comprises a third panel portion 48 pivotally hinged within the cut-out portion 24 of the second panel portion 34 by one or more hinges 50. In the example of FIGS. 3 and 4, there is shown plural separate hinges 50, which are concealed. It will be appreciated, however, that like the first door 20, the second door 22 could alternatively employ a single elongated piano hinge (not shown). In the example shown, three concealed hinges 50 are employed. Each hinge 50 includes a first hinge element 54 coupled to the second panel portion 34 adjacent the cut-out portion 24 therein and a second hinge element 56 coupled to the third panel portion 48 adjacent an edge 52 (e.g., edge 52 of third panel portion 48 of FIG. 3) thereof and cooperating with the first hinge element 54. In this manner, the hinges 50 are concealed in that they are not accessible from the exterior of the electrical enclosure 4 (see, e.g., FIG. 1).

It will be appreciated that the foregoing concealed hinges 50 may also be telescoping hinges such as the telescoping pin-slide hinges discussed previously herein. The door-in-door assembly 18 may also further include a locking mechanism 60 (FIGS. 1–4) structured to lock the second door 22 in its closed position (FIGS. 1 and 2) within the first door 20 and thus further restrict unauthorized access to the interior of the electrical enclosure 4. It will be appreciated that any known or suitable locking mechanism could be employed. The exemplary locking mechanism 60, as best shown in FIG. 4, is a key-locking mechanism which actuates a sliding mechanism 62 to slide and engage a plurality of tabs 64 disposed on the inner surface of the second door 22. The exemplary sliding mechanism 62 and a tab 64 of the exemplary locking mechanism 60 are shown in greater detail in FIG. 5. However, it will be appreciated that any known or suitable locking mechanism could be employed in any suitable configuration.

Figure 5:
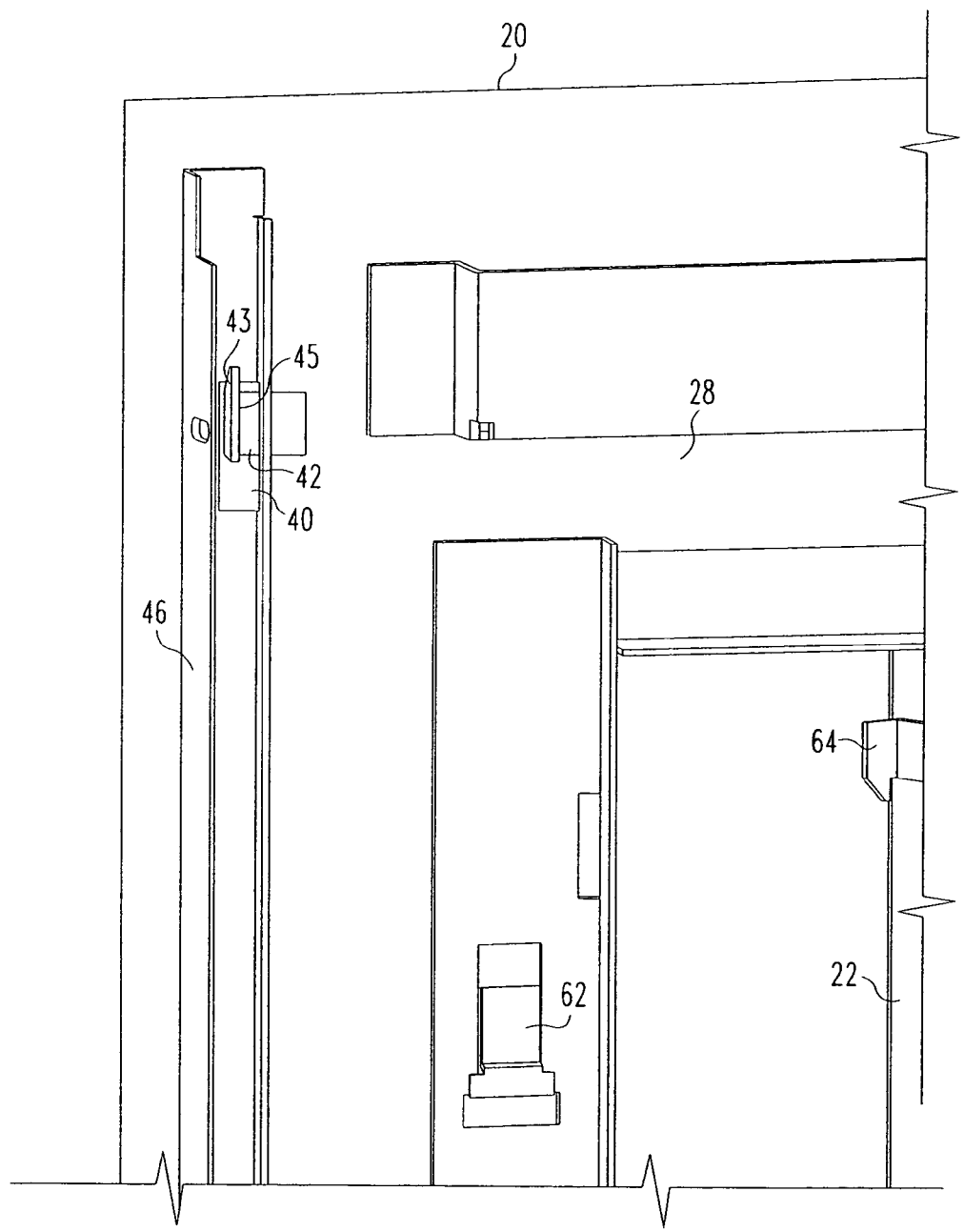
FIG. 5 is an isometric view of a portion of the concealed mounting mechanism of the cover assembly of FIG. 4.
Figure 6:
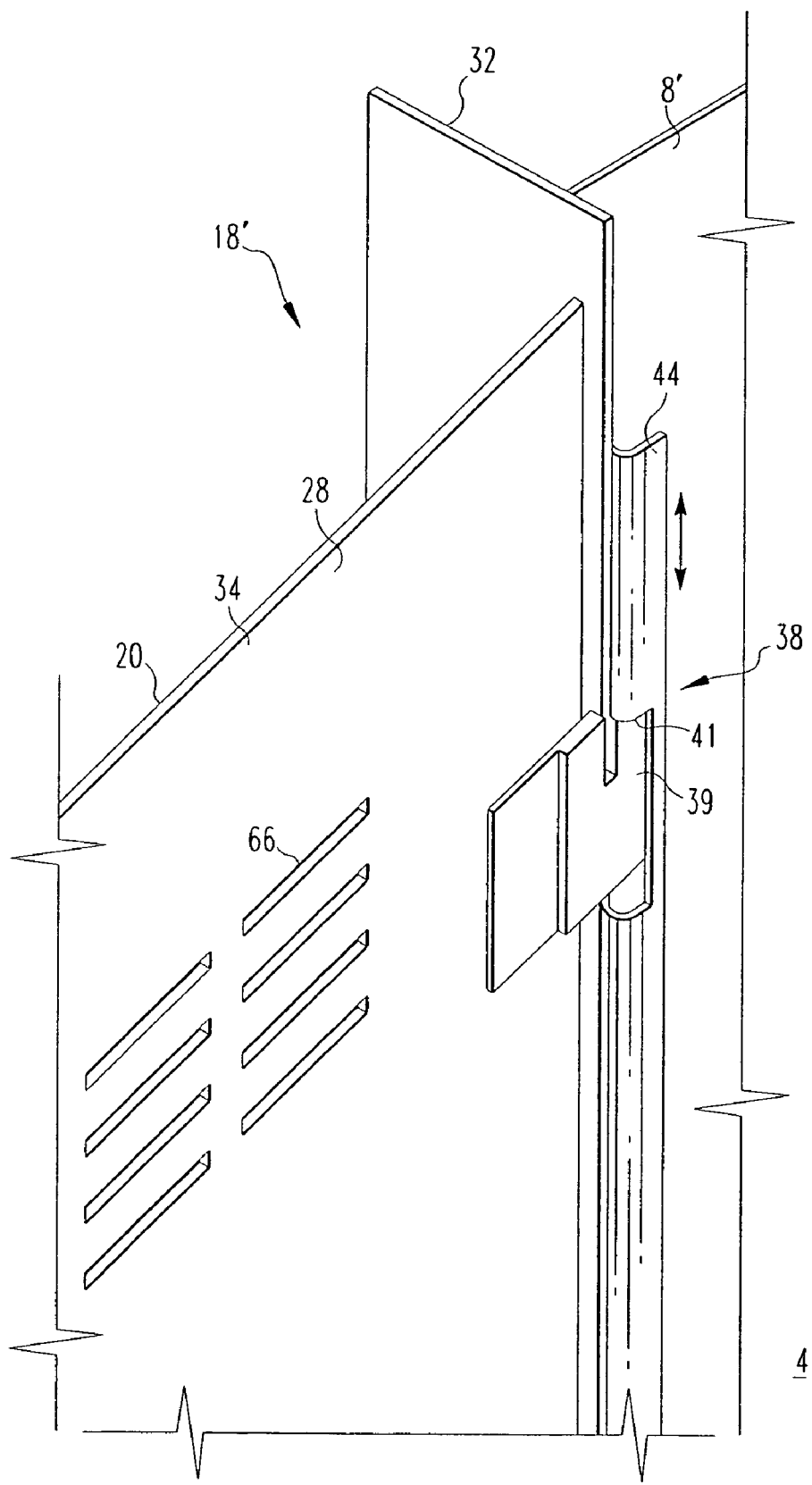
FIG. 6 is an isometric view of a portion of a concealed mounting mechanism in accordance with another embodiment of the invention.

As will be understood with reference to FIGS. 3–5, the exemplary concealed mounting mechanism 26 consists of a number of interconnecting receptacles 40 and tab projections 42 (FIGS. 4 and 5). Specifically, the inner surface 28 (FIGS. 4 and 5) of the hinged first door 20 includes the tab projections 42 (four tab projections are shown on each vertical side of the first door 20 of FIG. 4). The exemplary tab projections 42 are tabs made of a folded metal material, such as galvanized steel, and secured (e.g., without limitation, welded; Tox-locked) to the inner surface 28 of the first door 20 (best shown in FIG. 5). The interconnecting receptacles 40 are disposed on flanges, such as left and right flanges 44, 46 (FIG. 4). As shown in FIG. 4, the exemplary cover assembly 2 includes first and second side flanges 44, 46 and top and bottom flanges 47, 49 structured to secure to the left and right side walls 8, 10 and top and bottom walls 12, 14, respectively, of the housing 5 (FIG. 3).

As shown in greater detail with reference to side flange 46 of FIG. 5, the exemplary interconnecting receptacles 40 consist of a cut-out portion of the flange 46 corresponding to the location of the tab projection 42 of the first door 20. In operation, the exemplary tab projection 42 is inserted into the interconnecting receptacle 40 and the door 20 is moved to an engaged position in which a lip 43 of the tab projection 42 engages the flange 46. A bent portion 45 of the tab projection 42 extends generally perpendicularly from the tab projection 42, as shown, in order to resist the mounting mechanism 26 from accidentally coming unfastened. Thus, the exemplary mounting mechanism 26 is concealed in that none of the mounting components are accessible from the exterior of the electrical enclosure 4 (best shown in FIGS. 1 and 2). It will be appreciated, however, that the components of the concealed mounting mechanism 26, such as the tab projections 42 and interconnecting receptacles 40 could be alternatively configured in any suitable interconnecting manner. It will further be appreciated that while the flanges 44, 46, 47, 49 (FIG. 4) are shown and described as separate components structured to be coupled to the walls 8, 10, 12, 14 of the enclosure housing 5, respectively, that the flanges 44, 46, 47, 49 could alternatively be integral portions of the walls. For example, the top edges (from the perspective of FIG. 3) of the walls 8, 10, 12, 14 could be bent inwardly to project generally perpendicularly with respect to the walls 8, 10, 12, 14 in order to form an integral flange or the flanges could be Tox-locked or otherwise fastened in a suitable manner not requiring a separate fastening mechanism. The integral flange could then be further adapted to include the interconnecting receptacles (e.g., 40 (FIG. 5)). The interconnecting receptacles 40 and tab projections 42 in the exemplary embodiment shown and described herein, are also telescoping in order to provide adjust of the door-in-door assembly 18 with respect to the housing 5, as previously discussed. However, it will be understood that the concealed mounting mechanism 26 need not provide this telescoping capability.

It will also be appreciated that the electrical enclosure 4 may include additional components and features without departing from the scope of the present invention. For example, in the example shown and described herein, the first door 20 includes a top vent 66 and a bottom vent 68. Such vents may be included, for example, to provide ventilation in order to release exhaust gases discharged from electrical apparatus such as circuit breakers (not shown) housed within the enclosure 4. As shown in FIG. 4, the cover assembly may further include, for example, a duct 70, 72 for each of the vents 47, 49, respectively. It will, therefore, be appreciated that the electrical enclosure 4 shown and described hereinbefore is but one representative example of an enclosure and cover assembly, in accordance with the present invention.

Accordingly, the present invention provides a cover assembly 2 for an electrical enclosure 4 that utilizes a combination of a concealed mounting mechanism 26 and a door-in-door assembly 18 in order to provide fast and efficient authorized access to the interior of the enclosure 4 while simultaneously resisting unauthorized access thereto.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only, and not limiting as to the scope of the invention which is to given the full breadth of the claims appended and any and all equivalents thereof.

What is claimed is:

1. A cover assembly for an enclosure including a panel and a plurality of walls extending from said panel to define an opening, said cover assembly comprising:
   a door-in-door assembly including a first door and a second door, said first door having a cut-out portion and being structured to cover said opening of said enclosure, said second door being hinged within said cut-out portion of said first door;
   a concealed mounting mechanism structured to secure said door-in-door assembly to at least one of said walls of said enclosure without requiring a separate securing mechanism;
   wherein said second door being hinged within said cutout portion of said first door is operable between an open position in which the interior of said enclosure is accessible through said cut-out portion, without having to open said first door, and a closed position in which said cut-out portion is closed and the interior of said enclosure is inaccessible;
   wherein said first door is a hinged panel member structured to pivot open in order to provide access to the interior of said enclosure without having to entirely remove said first door;
   wherein said hinged panel member has an inner surface facing the interior of said enclosure and an exterior surface; wherein said hinged panel member includes a generally stationary first panel portion structured to be coupled to said at least one of said walls of said enclosure, and a larger second panel portion which is pivotally hinged to said first panel portion by at least one hinge; and wherein said larger second panel portion substantially defines said first door and includes said cut-out portion therein;
   wherein said concealed mounting mechanism is a number of interconnecting receptacles and tab projections; wherein the inner surface of said hinged panel member of said first door includes said tab projections; and wherein at least said at least one of said walls of said enclosure includes a flange having said interconnecting receptacles, each of said interconnecting receptacles being structured to receive and secure one of said tab projections; and
   wherein said interconnecting receptacles and tab projections are telescoping interconnecting receptacles and tab projections in order to provide adjustment of said door-in-door assembly with respect to said enclosure.

2. An electrical enclosure comprising:
   a housing comprising a panel and a plurality of walls extending from said panel to define an opening;
   a cover assembly coupled to at least one of said walls in order to provide controlled access to the interior of said housing, said cover assembly comprising:
   a door-in-door assembly including a first door and a second door, said first door having a cut-out portion and being structured to cover said opening of said housing, said second door being hinged within said cut-out portion of said first door;
   a concealed mounting mechanism securing said door-in-door assembly to at least one of said walls of said housing without requiring a separate securing mechanism;
   wherein said second door being hinged within said cut-out portion of said first door is operable between an open position in which the interior of said housing is accessible through said cut-out portion, without having to open said first door, and a closed position in which said cutout portion is closed and the interior of said housing is inaccessible;

wherein said first door is a hinged panel member structured to pivot open in order to provide access to the interior of said housing without having to entirely remove said first door;

wherein said hinged panel member has an inner surface facing the interior of said housing and an exterior surface; wherein said hinged panel member includes a generally stationary first panel portion coupled to said at least one of said walls of said housing, and a larger second panel portion which is pivotally hinged to said first panel portion by at least one hinge; and wherein said larger second panel portion substantially defines said first door and includes said cut-out portion therein;

wherein said concealed mounting mechanism is a number of interconnecting receptacles and tab projections; wherein the inner surface of said hinged panel member of said first door includes said tab projections; and wherein at least said at least one of said walls of said housing includes a flange having said interconnecting receptacles, each of said interconnecting receptacles receiving and securing one of said tab projections; and wherein said interconnecting receptacles and tab projections are telescoping interconnecting receptacles and tab projections in order to provide adjustment of said door-in-door assembly with respect to said housing.

* * * * *